Figure 1:
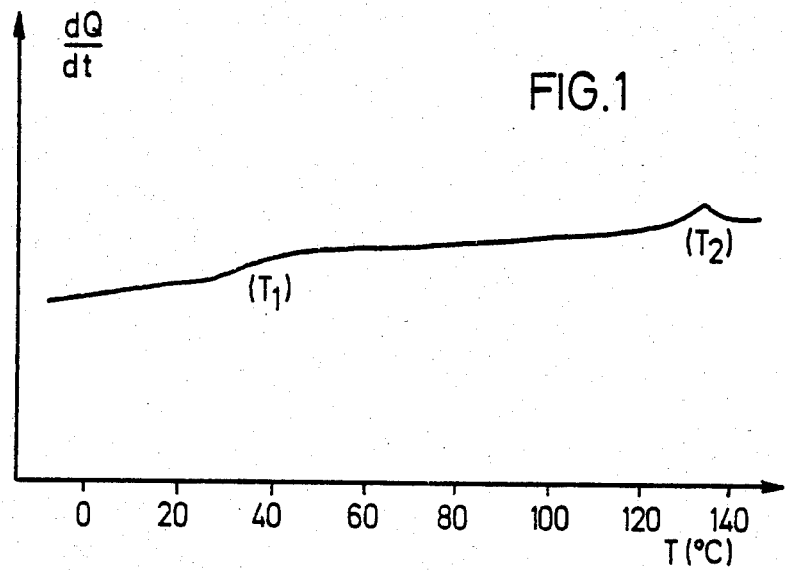

United States Patent [19]

Ringsdorf et al.

[11] Patent Number: 4,631,328

[45] Date of Patent: Dec. 23, 1986

[54] POLYMERS CONTAINING MESOGENIC GROUPS AND DYE RADICALS IN THE SIDE CHAINS

[75] Inventors: Helmut Ringsdorf, Mainz; Michael Portugall, Wachenheim; Hans W. Schmidt, Mainz; Karl H. Etzbach, Frankenthal, all of Fed. Rep. of Germany

[73] Assignee: BASF Aktiengesellschaft, Ludwigshafen, Fed. Rep. of Germany

[21] Appl. No.: 685,213

[22] Filed: Dec. 26, 1984

Related U.S. Application Data

[63] Continuation of Ser. No. 475,642, Mar. 15, 1983, abandoned.

[30] Foreign Application Priority Data

Mar. 27, 1982 [DE] Fed. Rep. of Germany ....... 3211400

[51] Int. Cl.[4] .................. C08F 26/06; C08F 20/70; C02F 1/13; C09K 19/52
[52] U.S. Cl. ................. 526/259; 526/304; 526/312; 526/321; 350/349; 252/299.1; 252/299.01
[58] Field of Search ........... 350/349, 340, 341; 252/299.1, 299.01; 526/259, 304, 312, 321, 262, 305, 313, 288, 292.2, 292.3

[56] References Cited

U.S. PATENT DOCUMENTS

| | | | |
|---|---|---|---|
| 4,107,290 | 8/1978 | Jacquet | 526/304 X |
| 4,232,949 | 11/1980 | Huffman | 252/299.1 X |
| 4,293,435 | 10/1981 | Portugall et al. | 252/299.01 |
| 4,299,720 | 11/1981 | Osman et al. | 252/299.1 |
| 4,358,391 | 11/1982 | Finkelmann | 260/397.2 X |
| 4,461,886 | 7/1984 | Rogers | 526/312 X |

OTHER PUBLICATIONS

Finkelmann et al., "Synthesis of Cholesteric Liquid Crystalline Polymers", Makromol. Chem. 179, 829–832 (1978).
Grebneva et al., "Liquid Crystalline Behaviour of Polymers on the Basis . . . " Advances in Liquid Crystal Research, p. 959–969, Ed. by Lajos Bata Pergamon Press, Oxford, 1980.
Lipatov et al., "Structural Features of LC State", Advances in Liquid Crystal Research, p. 943–957, 1980.
Tal oze et al., "Influence of the Structure of Mesogenic Groups . . . ", Advances in Liquid Crystal Research, (1980).
Shibaev, "Structure of Thermotropic Smectic Polymers", Advances in Liquid Crystal Research, (1980).
Finkelmann, "Synthesis, Structure, and Properties of Liquid Crystalline Side Chain Polymers", Ch. 2 of Polymer Liquid Crystals, Ed. by Ciferri et al., p. 35–62 (1982).
Pranato et al., "On the Electrical Switching . . . ", Mol. Cryst. Liq. Cryst. 98, 299–308 (1983).
Mol. Cryst. Liq. Cryst, 1981, vol. 78, pp. 270–277, "N-Substituted 2,3-Dicarboximido-Anthraquinone Dichroic Dyes" Aftergut and Cole, Jr.
14 Freiburger Aibelstagung, Apr. 1984, "Anthraquinone Dye Containing Liquid Crystalline Copolymers", pp. 2–13, Baur et al.
Thesis of H. W. Schmidt, pp. 31–56, 1984.

Primary Examiner—Teddy S. Gron
Assistant Examiner—Catherine S. Kilby
Attorney, Agent, or Firm—Oblon, Fisher, Spivak, McClelland & Maier

[57] ABSTRACT

The polymer chain comprises
(a) one or more monomers possessing a nematogenic, chiral or smectogenic group, or a mixture of monomers possessing a nematogenic group with those possessing a chiral group, and
(b) one or more monomers possessing a radical of a pleochroic dye, and the nematogenic, the chiral and the smectogenic groups are bonded to the polymerizable group either directly or, like the dye radicals, via a spacer.

The polymers can be used, together with low molecular weight liquid crystals or liquid crystal mixtures, in electrooptical displays.

6 Claims, 2 Drawing Figures

POLYMERS CONTAINING MESOGENIC GROUPS AND DYE RADICALS IN THE SIDE CHAINS

This application is a continuation of application Ser. No. 475,642, filed Mar. 15, 1983, now abandoned.

The present invention relates to polymers in which one of more mesogenic groups and one or more radicals of a pleochroic dye are bonded to the polymer chain via a spacer.

Suitable polymers, which are capable of forming nematic, smectic or colesteric phases, are disclosed in, for example, Germain Laid-Open Applications DOS No. 2,831,909 and DOS No. 2,722,589, but these polymers do not contain any dye radicals bonded to the polymer.

The novel polymers containing mesogenic groups and dye radicals are copolymers in which the polymer chain comprises (a) one or more monomers possessing a nematogenic, chrial or smectogenic group, or a mixture of monomers possessing a nematogenic group with those possessing a chiral group, and (b) one or more monomers possessing a radical of a pleochroic dye, and the nematogenic, the chiral and the smectogenic groups are bonded to the polymerizable group either directly or, like the dye radicals, via a spacer, and the polymer contains identical or different mesogenic groups and identical or different dye radicals.

Preferred polymers are those of the general formula

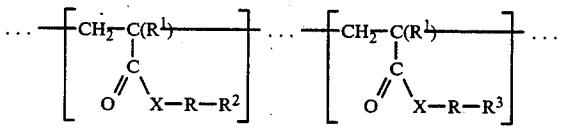

where $R^1$ is hydrogen or methyl, X is —O— or

R is a spacer or a chemical bond, $R^2$ is a mesogenic group, $R^3$ is a radical of a pleochroic dye and $R^4$ is hydrogen or unsubstituted or substituted alkyl, and the mesogenic group may also possess dye properties.

The polymers according to the invention can be used, together with low molecular weight liquid crystals or liquid crystal mixtures, in electrooptical displays. Depending on the spacers and/or the mesogenic groups, the novel polymers can also form liquid-crystalline phases. Such polymers can be employed alone in electrooptical displays.

$R^4$ is, for example, benzyl, $C_1-C_4$-alkyl, eg. ethyl, propyl, butyl or preferably methyl, and in particular hydrogen.

Particularly suitable spacers R are alkylene groups of 2 to 12 carbon atoms, which can be linear or branched, and interrupted by oxygen, sulfur and/or

Specific examples of radicals R are —(CH$_2$)$_2$—, —(CH$_2$)$_3$—, —(CH$_2$)$_4$—, —(CH$_2$)$_4$—, —(CH$_2$)$_6$—, —(CH$_2$)$_8$—, —(CH$_2$)$_{10}$—, —(Ch$_2$)$_{12}$—, —(CH$_2$)$_2$—O—(CH$_2$)$_2$—, —(CH$_2$)$_2$—S—(CH$_2$)$_2$—,

—(CH$_2$)$_2$—N(CH$_3$)—(CH$_2$)$_2$—, —CH(CH$_3$)—CH$_2$—.

Mesogenic groups $R^2$ are mentioned in Kelker and Hatz, Handbook of Liquid Crystals, Verlag Chemie, 1980, pages 67–113.

Mesogenic groups $R^2$ are preferably radicals of the formula

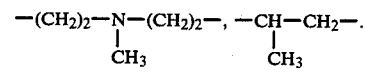

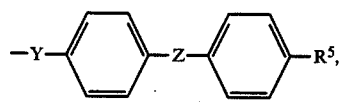

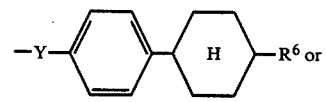

where
Y is —O—,

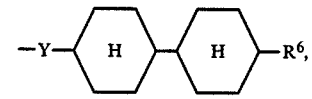

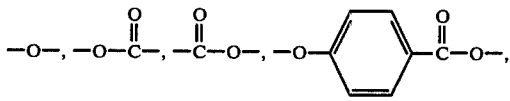

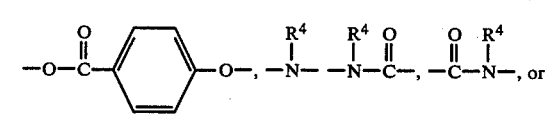

or —S—,
Z is a chemical bond or a radical of the formula

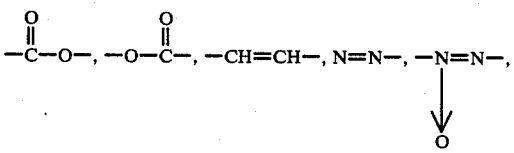

—N=CH— or —CH=N—, $R^5$ is hydrogen, $C_1-C_{12}$-alkyl, $C_5-C_7$-cycloalkyl, $C_1-C_{12}$-alkoxy, $C_1-C_{12}$-alkoxycarbonyl, $C_1-C_{12}$-alkanoyloxy, fluorine, chlorine, bromine, cyano or nitro, and $R^6$ is hydrogen, $C_1-C_{12}$-alkyl, $C_1-C_{12}$-alkoxy or $C_1-C_{12}$-alkoxycarbonyl.

Depending on the radical Z, the mesogenic groups of the formula

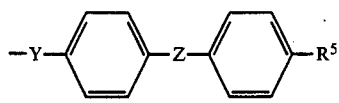

can themselves possess dye properties; this is the case in particular when Z is —N=N—, —CH=CH—, —CH=N— or

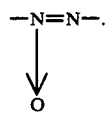

R³ is the radical of a pleochroic dye from the group entailing anthraquinone, the stilbene, the monzao, the bisazo and the triazo dyes, and the dye radical is bonded to the spacer or R via:

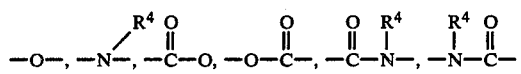

—S— or an imide group.

Dye radicals R³ are preferably bonded to the spacer via —O—, —S— or

and these atoms can constitute a part of an ether, ester, amine, imine, amide, imide or mercaptan group.

R³ is any pleochroic dye radical, preferably one derived from a substance which can also be used to impart color to low molecular weight liquid crystals or liquid crystal mixtures. Such dyes are described in, for example, Germain Laid-Open Applications DOS No. 2,627,215, DOS No. 2,640,624, DOS No. 3,034,249, DOS No. 3,014,933 and DOS No. 2,902,177, and by R. J. Cox in Mol. Cryst. Liq. Cryst. 55 (1979), 1–32 and G. W. Gray in Chimia 34 (1980), 47.

The dye radicals are preferably derived from the anthraquinone, the monoazo, the bisazo, the triazao and the stilbene series, particularly preferably from 1,4-diaminoanthraquinone-2,3-dicarboximide and from 1,4-diamino-2-(oxadiazol-3'-yl)-anthraquinone.

The polymers can contain from 0.1 to 40, preferably from 0.3 to 30, % by weight, based on the polymer, of dye radicals. The dye content is determined photometrically from the extinction at the absorption maximum.

The novel polymers can be prepared, for example, (a) by copolymerizing

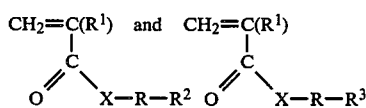

by a conventional method, or (b) by introducing the radicals —X—R—R² and —X—R—R³, by esterification, transesterification or amidation by a conventional method, into a polymeric compound of the formula

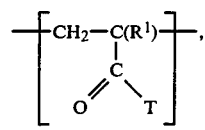

where T is a replaceable radical, e.g. chlorine or lower alkoxy (C. M. Paleos et al. in J. Polym. Sci. Polym. Chem. Ed. 19 (1981), 1427).

Details of the preparation can be found in the Examples.

The methods for the preparation of polymers possessing mesogenic groups can be found in Germain Laid-Open Application DOS. No. 2,831,909.

The polymers according to the invention can also contain various dyes (e.g. a mixture of black dyes) and various mesogenic groups, and can be employed, in particular together with low molecular weight liquid crystals or liquid crystal mixtures, in electrooptical displays. In these mixtures, it is possible to use both the liquid-crystalline and the non-liquid-crystalline polymers according to the invention. They serve as solubilizers for dyes, since, in order that dye displays based on the guest-host principle may be realized technically, the dyes used must possess, inter alia, a sufficiently high and substantially temperature-independent solubility in low molecular weight liquid crystals or liquid crystal mixtures.

Moreover, the novel polymers can be used to produce optimum low molecular weight liquid crystals or liquid crystal mixtures. Thus, for example, the phase behavior, the elastic constants and the order parameter of low molecular weight liquid crystals or liquid crystal mixtures can also be improved by the addition of the polymers according to the invention.

The novel polymers which form liquid-crystalline phases can be employed as such in electrooptical displays. In an electric field, these liquid-crystalline, dye-containing polymers exhibit the same electrooptic effects as low molecular weight guest-host systems. However, they permit an increase in the dye concentrations to any desired level, since the dyes are covalently bonded and hence separation cannot occur. In the case of these polymeric liquid-crystalline systems, the temperatures required for the electrooptical effects are above room temperature; however, the phase transition temperatures can be reduced by the addition of low molecular weight liquid crystals (plasticizer effect).

Moreover, dye-containing, liquid-crystalline polymers offer the possibility of storing information in electrooptical displays, since the phaes can be frozen by cooling the polymer to below the glass temperature.

FIG. 1 shows the behaviour of copolymer 16c as determined by differential calorimetry (heating rate: 10° C./min; T₁; glass temperature; T₂: clear point).

Figure 2:
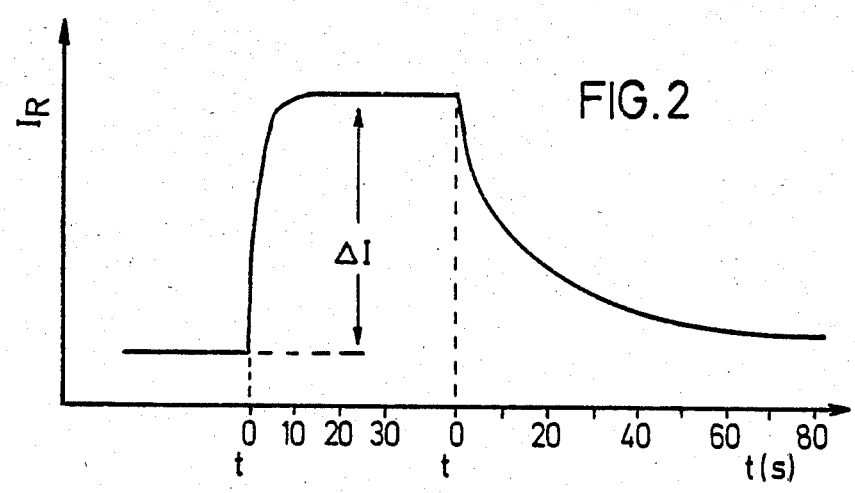

FIG. 2 shows the switching behavior of the homogeneously oriented copolymer 16e) with a polarizer at 115° C., 30 V, 50 Hz and a cell thickness of 12 μm ($i_R$ =relative light intensity).

In the Examples which follow, parts and percentages are by weight.

A Synthesis of the mesogenic monomers

EXAMPLE 1

4'-Cyanophenyl 4-(6-propenoyloxy-hexyloxy)benzoate (a) 4-(6-Hydroxyhexyloxy)-benzoic acid In a 1 liter three-necked flask equipped with a reflux condenser, a stirrer and a dropping funnel, 105 g of 4-hydroxybenzoic acid are dissolved in 280 ml of ethanol. A solution of 94 g of potassium hydroxide in 120 ml of water is added, and the dipotassium salt of the acid is obtained. A pinch of KI is added, and thereafter 80 ml of 6-chlorohexan-1-ol are added dropwise while stirring and refluxing. The reaction mixture is refluxed overnight. After the reaction is complete, the mixture is evaporated to dryness, the residue is taken up in water, the solution is extracted several times with ether, the ether solution is acidified with semi-concentrated hydrochloric acid, and the precipitated product is filtered off under suction and recrystallized repeatedly from ethanol.

Yield: 84.4 g (47% of theory)
Mp.: 137° C.
Elementary analysis: calculated: 65.53% C, 7.61% H ($C_{13}H_{18}O_4$). found: 65.19% C, 7.69% H.

(b) 4-(6-Propenoyloxy-hexyloxy)-benzoic acid 59.5 g of 4-(6-hydroxyhexyloxy)-benzoic acid, 10 g of 4-toluenesulfonic acid, 5 g of hydroquinone, 150 ml of acrylic acid and 150 ml of chloroform are initially taken in a round-bottomed flask equipped with a water separator. The stirred reaction mixture is refluxed for 15 hours, cooled and then introduced into from 3 to 4 times its amount of ether. The ether solution is extracted several times by shaking with warm water, and is dried with sodium sulfate. The solution is evaporated down to half its volume in a rotary evaporator, and is left in a freezer for 12 hours at −20° C. During this procedure, the acrylate separates out in crystalline form from the solution, and is filtered off under suction. The crude product is purified by recrystallizing it from a 1:2 mixture of ethanol and petroleum ether.

Yield: 36.1 g (50% of theory)
Mp.: k 86 n 96 i (k=crystalline, n=nematic, i=isotropic)
Elementary analysis: calculated: 65.75% C, 6.85% H ($C_{16}H_{20}O_5$). found: 66.0% C, 6.90% H.

(c) 4'-Cyanophenyl 4-(6-propenoyloxy-hexyloxy)-benzoate 29.2 g of 4-(6-propenoyloxy-hexyloxy)-benzoic acid are stirred with 80 ml of thionyl chloride for 20 minutes at room temperature. Two drops of dimethylformamide are added as a catalyst, and a pinch of 2,6-di-tert.-butyl-p-cresol is used as an inhibitor. The excess thionyl chloride is removed first by means of a waterpump and then with an oil pump. The acid chloride which remains is dissolved in 100 ml of absolute tetrahydrofuran. 12 g of p-cyanophenol and 20 ml of triethylamine in 100 ml of absolute tetrahydrofuran are initially taken in a three-necked flask equipped with a dropping funnel, a stirrer and an internal thermometer. The acid chloride solution is slowly added dropwise to the stirred, cooled mixture, and the temperature should not exceed 10° C. Thereafter, the mixture is left to react overnight. The tetrahydrofuran is then completely stripped off, the residue is dissolved in 200 ml of methylene chloride, and the solution is extracted several times by shaking with water, and is dried with sodium sulfate. The solution of the phenyl benzoate is evaporated to dryness, and the residue is taken up in a very small amount of methylene chloride. The crude product is purified by column chromatography over silica gel, using a 4:1 mixture of petroleum ether and ethyl acetate as the mobile phase. The product is then recrystallized twice from ethanol.

Yield: 24.4 g (62% of theory)
Mp.: 76°–78° C.
Elementary analysis: ($C_{20}H_{23}NO_5$) calculated: 70.23% C, 5.85% H, 3.56% N. found: 69.79% C, 5.88% H, 3.67% N.

EXAMPLE 2

Trans,trans-4'-methoxybicyclohexyl 4-acrylate (a) Trans,trans-4,4'-bicyclohexyl dibenzoate 100 g of 4,4'-dihydroxybiphenyl are dissolved in 500 ml of absolute ethanol, 3 spoons of Raney nickel are added as a catalyst, and both phenol rings are hydrogenated in an autoclave at 200° C. under a hydrogen pressure initially of 110 atm and thereafter 185 atm. After 24 hours, absorption of hydrogen is complete. The catalyst is separated off by centrifuging, the ethanolic solution is evaporated to dryness, the residue is digested in hot 5% strength sodium hydroxide solution, the solution is left to cool to room temperature, and the precipitated product is filtered off under suction and dried completely to give 66 g (61% of theory) of an isomer mixture. The isomers are separated via the dibenzoates. In a three-necked flask, 40 g of the isomer mixture are dissolved in 200 ml of dioxane and 120 ml of pyridine, 130 g of benzoyl chloride are slowly added dropwise at the boil and the reaction mixture is refluxed overnight. Thereafter, the solvent and the auxiliary base are removed from the mixture under reduced pressure from a waterpump, the residue is dissolved in a 1:1 mixture of benzene and chloroform, the solution is extracted by shaking with warm sodium carbonate solution, dilute hydrochloric acid and water, is dried and is then evaporated down to about 70%, and the pure trans,trans isomer is precipitated on cooling. The crude product is filtered off under suction, recrystallized from benzene and dried at 80° C.

Yield: 22 g (27% of theory)
Mp.: 207° C.
Elementary analysis: calculated: 76.80% C, 7.40% H ($C_{26}H_{30}O_4$). found: 77.01% C, 7.20% H.

(b) Trans,trans-4,4'-bicyclohexyldiol 20 g of trans,trans-4,4'-bicyclohexyl dibenzoate in 225 ml of methanol and 20 ml of water are hydrolyzed with 12.5 g of potassium hydroxide. The reaction mixture is refluxed for 12 hours, and 150 ml of water are then added. On concentrating the solution, the diol is precipitated; it is filtered off under suction, and purified by being recrystallized from ethyl acetate.

Yield: 9.7 g (98% of theory)
Mp.: 213° C.
Elementary analysis: calculated: 72.72% C, 11.20% H ($C_{12}H_{22}O_2$). found: 72.34% C, 11.43% H.

(c) Trans,trans-4,4'-bicyclohexyldiol monobenzoate

A solution of 14 ml of benzoyl chloride in 140 ml of dioxane is added dropwise to a refluxing solution of 20 g of trans,trans-4,4'-bicyclohexyldiol in 1,500 ml of dioxane and 137 ml of pyridine. The reaction mixture is refluxed for a further two hours, and the major part of the solvent is then removed. When water is added, an organic substance is precipitated. It is filtered off under suction, dried, and digested in 500 ml of hot carbon tetrachloride, and the solution is cooled to room temperature and filtered. The diol, which is insoluble in $CCl_4$ at room temperature, is obtained as a residue on the filter. The filtrate is evaporated to dryness, the residue is partially dissolved in methanol at 30° C., and the solution is filtered at room temperature. As a result of this procedure, the monobenzoate passes into solution while the dibenzoate remains as a residue on the filter. The methanolic solution is evaporated down, and the crude product is recrystallized from a 1:1 mixture of ethyl acetate and petroleum ether.

Yield: 8.9 g (29% of theory)
Mp.: 157° C.
Elementary analysis: calculated: 75.51% C, 8.70% H ($C_{19}H_{26}O_3$). found: 74.99% C, 8.61% H.

(d) Trans,trans-4'-methoxybicyclohexyl 4-benzoate 4.7 g of the monobenzoate 2(c) are suspended in 20 ml of methyl iodide, the suspension is refluxed and a total of 8 g of silver(I) oxide is added a little at a time, at a rate of 1 g per hour. The reaction mixture is refluxed for a further 2 days, after which the excess methyl iodide is distilled off, the residue is diluted with 80 ml of chloroforma, and the catalyst is filtered off under suction. The solution is dried with sodium sulfate and then evaporated down, and the residue is purified by column chromatography using silica gel/methylene chloride.

Yield: 3.1 g (63% of theory)
Mp.: 105° C.
Elementary analysis: calculated: 75.92% C, 8.92% H ($C_{20}H_{28}O_3$). found: 75.74% C, 9.01% H.

(e) Trans,trans-4'-methoxybicyclohexyl-4-ol

To hydrolyze the ester, 3 g of the benzoate 2d) are refluxed for 12 hours with 75 ml of methanol, 10 ml of water and 3 g of potassium hydroxide. The methanolic solution is evaporated down, 80 ml of water are added and the precipitated product is filtered off under suction and washed several times with water. The crude product is purified by recrystallizing it from low-boiling petroleum ether.

Yield: 2.0 g (95% of theory)
Mp.: 79° C.
Elementary analysis: calculated: 73.54% C, 11.57% H ($C_{13}H_{24}O_2$). found: 73.39% C, 11.48% H.

(f) Trans,trans-4'-methoxybicyclohexyl-4-acrylate 1 part of trans,trans-4'-methoxybicyclohexyl-4-ol are dissolved in 10 ml of methylene chloride, and 1 g of triethylamine and a pinch of 4-dimethylaminopyridine are added. 0.9 g of acryloyl chloride in 5 ml of methylene chloride are added dropwise to this solution at room temperature, while stirring. After 24 hours, the solution is diluted with methylene chloride and then poured onto 100 ml of ice-water. The organic phase is washed twice with water, dried over sodium sulfate and evaporated down, and the crude product is purified by column chromatography (silica gel/methylene chloride).

Yield: 0.7 g (53% of theory)
Mp.: 45° C.
Elementary analysis: calculated: 72.17% C, 9.84% H ($C_{16}H_{26}O_3$). found: 72.58% C, 9.75% H.

EXAMPLE 3

4'-Methoxyphenylcyclohexyl 4-trans-acrylate 2 parts of trans-4-(4'-methoxyphenyl)-cyclohexanol are converted under the same conditions as those described in Example 2f).

Yield: 1.3 g (50% of theory)
M.p.: 58° C.
Elementary analysis: calculated: 73.82% C, 7.74% H ($C_{16}H_{20}O_3$). found: 73.95% C, 7.81% H.

B Synthesis of the dye monomers

EXAMPLE 4

4-(6-Propenoyloxyhexyloxy)-4'-cyanozaobenzene (a) 4-(6-Hydroxyhexyloxy)-4'-cyanoazobenzene 22.3 g of 4'-cyano-4-hydroxyazobenzene and 14 g of dry potassium carbonate are dissolved in 100 ml of absolute acetone, a pinch of KI is added, and 15.3 g of 6-chlorhexan-1-ol are then added dropwise at the boil. The reaction mixture is refluxed for 6 days. The precipitated potassium chloride is filtered off under suction from the warm mixture, and the solution is evaporated down. 200 ml of $CHCl_3$ are added to the dye obtained, and the chloroform solution is filtered off drom undissolved material, extracted by shaking four times with $H_2O$ and evaporated down. The crude product is recrystallized from 300 ml of acetone.

Yield: 15.3 g (47% of theory)
Mp.: 147° C.
Elementary analysis: ($C_{19}H_{21}N_3O_2$) calculated: 69.71% C, 6.47% H, 12.83% N. found: 70.38% C, 6.24% H, 13.20% N.

(b) 4-(6-Propenoyloxyhexyloxy)-4'-cyanoazobenzene 6.5 g of 4-(6-hydroxyhexyloxy)-4'-cyanoazobenzene are dissolved in 30 ml of absolute tetrahydrofuran at 60° C., 3.1 ml of triethylamien are added, and a solution of 1.8 ml of acryloyl chloride in 5 ml of tetrahydrofuran is then added dropwise at 60° C. The reaction mixture is cooled, and is stirred at room temperature for 20 hours. 150 ml of chloroform are added, after which the solution is extracted by shaking with $H_2O$ and dried over $Na_2SO_4$. The crude product is recrystallized from 350 ml of a 6:1 mixture of ethanol and acetone.

Yield: 4.5 g (60% of theory)
Mp.: 93° C.; $\lambda_{max}$ 366 nm ($CHCl_3$).
Elementary analysis ($C_{22}H_{23}N_3O_3$): calculated: 70.01% C, 6.14% H, 11.13% N. found: 69.94% C, 6.34% H, 11.14% N.

EXAMPLE 5

1,4-Diaminoanthraquinone-2,3-dicarboxylic acid N-(6-propenoyloxyhexyl)-imide (a) 1,4-Diaminoanthraquinone-2,3-dicarboxylic acid N-(6-hydroxyhexyl)-imide A mixture of 9.2 g of 1,4-diaminoanthraquinone-2,3-dicarboxylic acid imide, 1.8 g of sodium methylate and 50 g of dimethylformamide is heated to 100° C., 4.9 g of 6-chlorohexan-1-ol are added, the mixture is heated at 100° C. for 3 hours, allowed to cool and poured onto 300 g of water, and the precipitated product is filtered off under suction, washed with water, dried and then recrystallized from 1,1,2-trichloroethane.

Yield: 7.1 g (58% of theory)
Mp.: 203°–205° C.

(b) 1,4-Diaminoanthraquinone-2,3-dicarboxylic acid N-(6-propenoyloxyhexyl)-imide A solution of 3.1 g of 5(a) in 50 ml of absolute dioxane is heated to 90° C., 0.86 g of triethylamine and thereafter 0.77 g of acryloyl chloride are added, the mixture is heated at 90° C. for half an hour, allowed to cool and poured onto 200 ml of water, and the precipitated product is filtered off under suction, washed with water and dried. The crude product is purified by recrystallization from toluene.

Yield: 1.8 g (51% of theory)
Mp.: 153°–154° C.; $max$ 672 nm ($CH_2Cl_2$).

The dye monomers of Examples 6 to 12 are obtained by procedures similar to those described in Examples 4 and 5, while the dye monomers of Examples 13 to 15 are obtained as described in Example 1c:

EXAMPLE 6

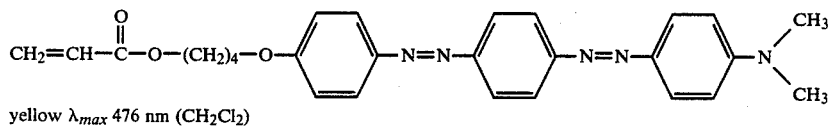

yellow $\lambda_{max}$ 476 nm (CH$_2$Cl$_2$)

EXAMPLE 7

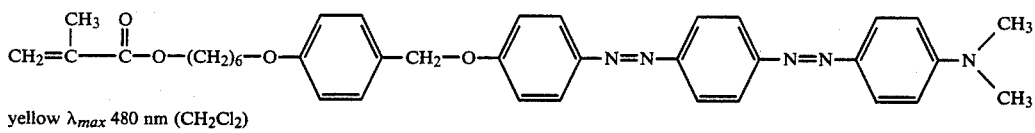

yellow $\lambda_{max}$ 480 nm (CH$_2$Cl$_2$)

EXAMPLE 8

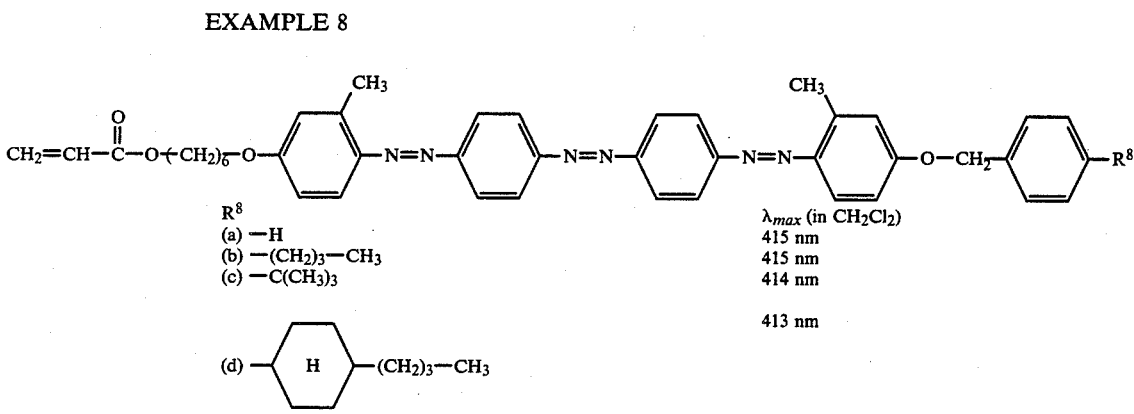

| R$^8$ | | $\lambda_{max}$ (in CH$_2$Cl$_2$) |
|---|---|---|
| (a) | —H | 415 nm |
| (b) | —(CH$_2$)$_3$—CH$_3$ | 415 nm |
| (c) | —C(CH$_3$)$_3$ | 414 nm |
| (d) | cyclohexyl —(CH$_2$)$_3$—CH$_3$ | 413 nm |

EXAMPLE 9

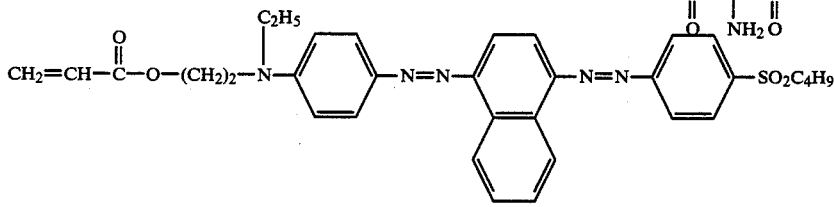

red

EXAMPLE 10

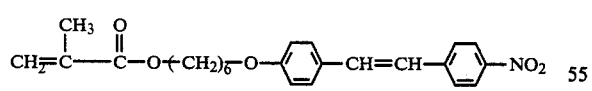

yellow

EXAMPLE 11

(structure shown above Example 8 region)

blue $\lambda_{max}$ 669 nm (CH$_2$Cl$_2$)

EXAMPLE 12

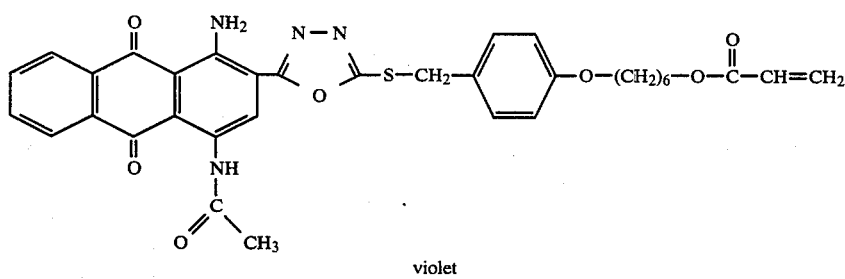

violet

EXAMPLE 13

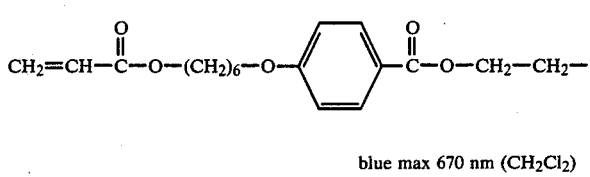
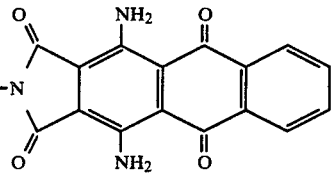

blue max 670 nm (CH$_2$Cl$_2$)

EXAMPLE 14

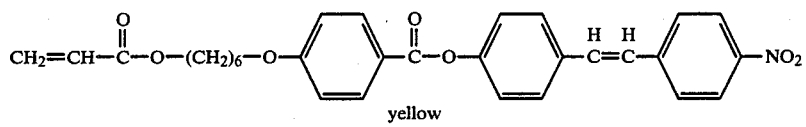

yellow

EXAMPLE 15

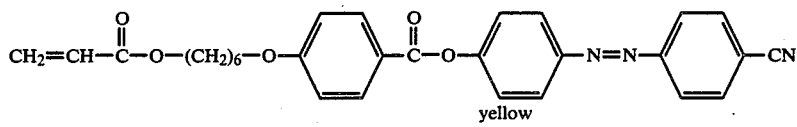

yellow

C Synthesis of the polymers according to the invention

The monomers described in Examples 1 to 3 and 4 to 15 are subjected to free-radical copolymerization in isotropic solution by the following general method:

In a shaken vessel, about 1 g of monomer mixture is dissolved in 8 ml of absolute tetrahydrofuran or toluene, and 1 mole %, based on the monomer, of AIBN is added. The monomer solution is degassed by passing in nitrogen for 10 minutes, and polymerization is then carried out under thermostatically controlled conditions. The polymers obtained are precipitated with cold ether, dissolved in methylene chloride and re-precipitated. This procedure is repeated until the monomer is no longer detectable by thin layer chromatography. The purified polymer is dried at from 30° to 40° C., under reduced pressure from an oil pump.

The composition of the copolymers is determined quantitatively by UV spectroscopy and elementary analysis.

The optical behavior of the liquid-crystalline copolymers is determined with an Ortholux II Pol-BK polarization microscope from Leitz. The samples are mounted between a lens holder and a glass cover, and heated with the aid of an FP 52 heating table from Mettler.

Investigations of the novel polymers by differential calorimetry are carried out using a DSC 2c instrument from Perkin Elmer. The substances (1-3 mg) are weighed into small aluminum pans, and these are closed with a lid. Before the actual measurement is carried out, the sample is heated to above the melting point or clear point. The rate of heating in each case is 10° C. per minute. The measurements are evaluated with the aid of a Micro 621 computer from Dietz. The associated software was developed by the research group of Professor Kosfeld (Aachen/Duisburg).

EXAMPLE 16

The copolymer of 4'-cyanophenyl 4-(6-propenoyloxyhexyloxy)-benzoate (Example 1) with 4-(6-propenoyloxyhexyloxy)-4'-cyanoazobenzene (Example 4) is prepared in accordance with the general method, and the amount of the dye monomer is varied. The resulting purified polymers exhibit typical nematic behavoir, and, when heated to just below the clear point for from 1 to 2 hours, have a characteristic, nematic schlieren texture.

The results of the investigations by polarization microscopy and by differential calorimetry, and the composition of the copolymers, are summarized in Table 1 (g: glassy, n: nematic, i: isotropic).

TABLE 1

| Example | Dye content (% by weight) | Phase transitions (°C.) |
|---|---|---|
| 16a | 6 | g 31 n 130 i |
| 16b | 10 | g 34 n 129 i |
| 16c | 14 | g 33 n 129 i |
| 16d | 19 | g 34 n 130 i |
| 16e | 40 | g 32 n 132 i |

EXAMPLE 17

(a) Copolymers 16(a) to 16(e) can be mixed, for example, with low molecular weight liquid crystals, e.g. nematic 4'-cyanophenyl 4-n-heptylbenzoate (cf. 17b), to give a homogeneous mixture. The two components of the mixture are weighed into a glass tube with a snap cover, and are dissolved in methylene chloride. The solvent is evaporated off, and the mixture is then dried completely under reduced pressure from an oil pump, and heated above the clear point for from one to two hours.

The phase behavior, determined by differential calorimetry and polarization microscopy, of a mixture of 26% by weight of a low molecular weight component (b) and 74% by weight of a copolymer (Example 16e), and that of the pure copolymer 16(e), are summarized in Table 2.

TABLE 2

| Example | Composition ($X_{II}$) | Dye content (% by weight) | Phase transitions |
|---|---|---|---|
| (16e) | 0 | 40 | g 32 n 132; |

TABLE 2-continued

| Example | Composition ($X_{II}$) | Dye content (% by weight) | Phase transitions |
|---|---|---|---|
| (17a) | 0.26 | 30 | g-2 n 103; |

$X_{II} = \frac{m_{II}}{m_{II} + m_{I}}$, $m_I$ = mass of product from Example (16e), $m_{II}$ = mass of product from Example (17b).

The switching times of the homogeneously preoriented copolymer 16(e) and those of the mixture from Example 17(a), at 10 V, 20 V and 30 V, 50 Hz and a cell thickness of 12 μm, and using a polarizer, are listed in Table 3.

TABLE 3

| Example | Voltage (V) | Temperature | Switching time (sec) 90% |
|---|---|---|---|
| 16(e) | 30 | 115 | 1.2 |
| 17(a) | 30 | 81 | 0.8 |
| 16(e) | 20 | 115 | 2.3 |
| 17(a) | 20 | 81 | 1.3 |
| 16(e) | 10 | 115 | 6.0 |
| 17(a) | 10 | 81 | 2.0 |

(b) 4'-Cyanophenyl 4-n-heptylbenzoate 5 g of p-n-heptylbenzoic acid in 20 ml of absolute tetrahydrofuran are slowly added dropwise to a solution of 2.5 g of p-cyanophenol in 20 parts by volume of absolute tetrahydrofuran and 4 ml of triethylamine, at room temperature. After 3 hours, the reaction mixture is dissolved in 100 ml of a 1:1 mixture of chloroform and methylene chloride, and the solution is extracted by shaking several times with water. The organic phase is dried over sodium sulfate and then evaporated down. The crude product is purified by recrystallization from ethanol.

Yield: 4.3 g (62% of theory)

Phase behavoir: k 44 n 55 i

Elementary analysis ($C_{21}H_{23}NO_2$): calculated: 78.48% C, 7.21% H, 4.36% N. found: 78.32% C, 7.28% H, 4.30% N.

By mixing a low molecular weight nematic compound (Example 17b) into a nematic copolymer according to the invention (Example 16e), the properties of the low molecular weight component as well as those of the polymeric component can be improved. In the case of the nematic copolymer, the phase transition temperatures are reduced, and the lower viscosity of the mixture results in shorter switching times. On the other hand, the polymeric liquid crystals inhibit crystallization of the low molecular weight component.

EXAMLE 18

Copolymers of 4'-cyanophenyl 4-(6'-propenoyloxyhexyloxy)-benzoate (cf. Example 1) and 1,4-diaminoanthraquinone-2,3-dicarboxylic acid N-(6'-propenoyloxyhexyl)imide (cf. Example 5) are prepared in accordance with the general method, the ratio of the monomers being varied. Dioxane is used as the solvent, and the polymerization is carried out for 46 hours at 70° C.

The results of the investigations by polarization microscopy and differential calorimetry, and the composition of the copolymers (dye content), are summarized in Table 4.

TABLE 4

| Example | Dye content (% by weight) | Phase transitions (°C.) |
|---|---|---|
| 18a | 6 | g 31 n 112 |
| 18b | 5 | g 32 n 119 |
| 18c | 15 | g 34 n 102 |
| 18d | 19 | g 42 n 105 |
| 18e | 30 | g 50 n 91 |
| 18f | 39 | g 63 |

EXAMPLE 19

Homogeneous mixtures of the copolymers 18a, 18c, 18d and 18 e with low molecular weight liquid crystals (binary mixture comprising 60 mole % of 17b and 40 mole % of 4'-cyanophenyl 4-n-pentylbenzoate synthesized similarly to Example 17(b) are prepared by a procedure similar to that described in Example 17a.

The copolymer content, and the resulting dye content, of the individual mixtures, as well as their clear points, are summarized in Table 5.

TABLE 5

| Mixture | Content of copolymer No. | (% by weight) | Dye content (% by weight) | Phase | Clear point (°C.) |
|---|---|---|---|---|---|
| 19a | 18(a) | 13.4 | 0.8 | n | 60 |
| 19b | 18(c) | 9.9 | 1.5 | n | 59 |
| 19c | 18(d) | 7.9 | 1.5 | n | 58 |
| 19d | 18(e) | 5.1 | 1.5 | n | 57 |

We claim:

1. A polymer, wherein the polymer chain comprises monomers of the formula:

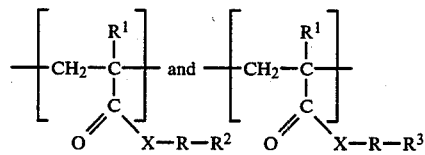

wherein $R^1$ is hydrogen or methyl, X is —O— or —N—$R^4$; R is a linear or branched $C_2$–$C_{12}$-alkylene group which is uninterrupted or interrupted by one or more of the groups —O—, —S— or —N—$R^4$; $R^2$ is a radical of the formula:

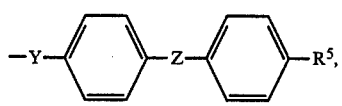

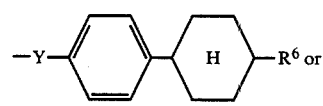

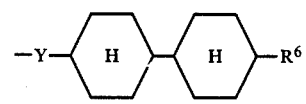

where Y is

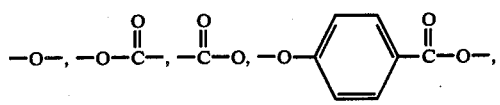

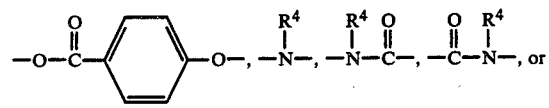

and Z is a chemical bond or

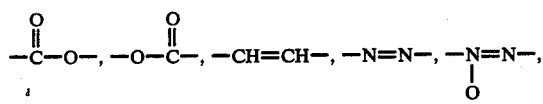

$R^5$ is hydrogen, $C_1$-$C_{12}$-alkyl, $C_5$-$C_7$-cycloalkyl, $C_1$-$C_{12}$-alkoxy, $C_1$-$C_{12}$-alkoxycarbonyl, $C_2$-$C_{12}$-alkanoyloxy, fluorine, chlorine, bromine, cyano or nitro, and $R^6$ is hydrogen, $C_1$-$C_{12}$-alkyl, $C_1$-$C_{12}$-alkoxy or $C_1$-$C_{12}$-alkoxycarbonyl; $R^3$ is the radical of a pleochroic dye comprising anthraquinone, stilbene, monoazo, bisazo and trisazo dyes, which is bonded to R via

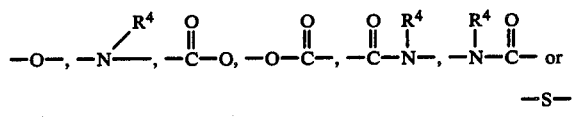

or an imide group; and $R^4$ is hydrogen or unsubstituted or substituted $C_1$-$C_4$-alkyl, and which contains from 0.1 to 40% by weight, based on the polymer, of the $R^3$ dye radicals.

2. The polymer as claimed in claim 1, wherein X is —O—, R is a linear or branched $C_2$-$C_{12}$-alkylene, —(CH$_2$)$_2$—O—(CH$_2$)$_2$—, —(CH$_2$)$_2$—S—(CH$_2$)$_2$— or —(CH$_2$)$_2$—N—(CH$_2$)$_2$—, Y is —O—,
                                              |
                                             CH$_3$

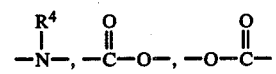

or —S—, Z is a chemical bond,

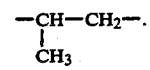

$R^3$ is a radical from an anthraquinone, monoazo, bisazo or trisazo dye which is bonded to R via —O—,

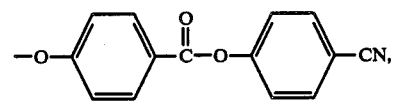

or —S— and $R^4$ is hydrogen or methyl.

3. The polymer as claimed in claim 1, wherein on the polymer, of the $R^3$ dye radicals.

4. The polymer as claimed in claim 1, wherein R is —(CH$_2$)$_2$—, —(CH$_2$)$_3$—, —(CH$_2$)$_4$—, —(CH$_2$)$_5$—, —(CH$_2$)$_6$—, —(CH$_2$)$_8$—, —(CH$_2$)$_{10}$—, —(CH$_2$)$_{12}$— or

—CH—CH$_2$—.
  |
 CH$_3$

5. The polymer as claimed in claim 1, wherein $R^2$ is trans, trans-4'-methoxybicyclohexyloxy, 4'-methoxyphenylcyclohexyloxy or

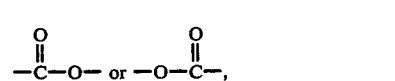

6. The polymer as claimed in claim 1, wherein $R^3$ is

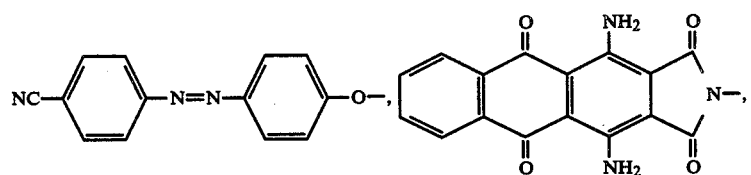

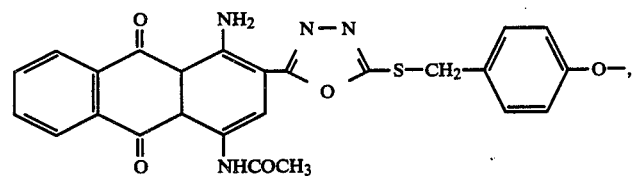

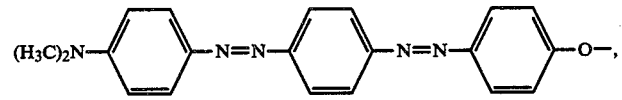

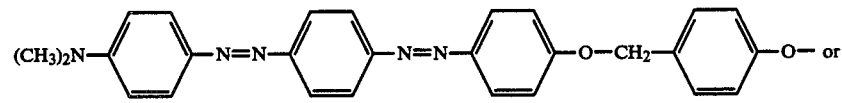

-continued
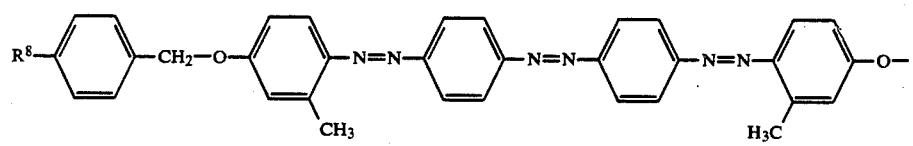
and $R^8$ is hydrogen, n-butyl, tert.-butyl or 4'-n-butylcyclohexyl.
* * * * *